United States Patent
Bhatia et al.

(10) Patent No.: US 11,461,349 B2
(45) Date of Patent: Oct. 4, 2022

(54) DATA FILTERING UTILIZING CONSTRUCTED GRAPH STRUCTURE

(71) Applicant: SAP SE, Walldorf (DE)

(72) Inventors: Anubhav Bhatia, Sunnyvale, CA (US); Martin Weiss, San Mateo, CA (US); Oliver Mainka, Capitola (DE); Ankit Shivhare, Mountain View, CA (US); Rajarshi Ghosh, Mannheim (DE); Lauren McMullen, El Dorado Hills, CA (US)

(73) Assignee: SAP SE, Walldorf (DE)

( * ) Notice: Subject to any disclaimer, the term of this patent is extended or adjusted under 35 U.S.C. 154(b) by 209 days.

(21) Appl. No.: 16/864,785

(22) Filed: May 1, 2020

(65) Prior Publication Data

US 2021/0342336 A1 Nov. 4, 2021

(51) Int. Cl.
| | |
|---|---|
| *G06F 16/21* | (2019.01) |
| *G06F 16/248* | (2019.01) |
| *G06F 16/28* | (2019.01) |
| *G06F 16/901* | (2019.01) |

(52) U.S. Cl.
CPC .......... *G06F 16/248* (2019.01); *G06F 16/212* (2019.01); *G06F 16/288* (2019.01); *G06F 16/9024* (2019.01)

(58) Field of Classification Search
CPC .... G06F 16/248; G06F 16/212; G06F 16/288; G06F 16/9024; G06F 16/245
See application file for complete search history.

(56) References Cited

U.S. PATENT DOCUMENTS

| | | | | |
|---|---|---|---|---|
| 10,452,678 | B2* | 10/2019 | Kumar | G06F 16/904 |
| 11,030,242 | B1* | 6/2021 | Borthakur | G06F 16/90335 |
| 2008/0046462 | A1* | 2/2008 | Kaufman | G06F 16/2423 |
| 2011/0261049 | A1* | 10/2011 | Cardno | G06Q 10/10 |
| | | | | 345/419 |
| 2017/0006135 | A1* | 1/2017 | Siebel | H04L 67/2833 |
| 2019/0050437 | A1* | 2/2019 | Goyal | G06F 16/211 |
| 2020/0026790 | A1* | 1/2020 | MacLean | G06F 16/904 |

* cited by examiner

*Primary Examiner* — Jorge A Casanova
(74) *Attorney, Agent, or Firm* — Fountainhead Law Group P.C.

(57) ABSTRACT

A global filter allows data filtering using attributes across multiple Analysis Tools (ATs), by broadcasting semantic filter context objects. Upon selecting object attribute values, the filter context object is created with attribute names and values. A processing engine resolves the filter context object to a data object, and then subsequently to target data. A lateral filter finds related entities in a relational database, without having to maintain and/or duplicate all of the data into a graph database. The processing engine resolves lateral filters using an entity graph path calculation conducted in conjunction with the generation of a bootstrapped graph structure. That graph structure is constructed (bootstrapped) utilizing available database schematic information—e.g., pre-calculated (key) relations and metadata read from the relational database. From that information, relationships in the bootstrapped graph structure are determined. Possible paths between entities are used to generate an optimized SQL query to reach target data.

16 Claims, 23 Drawing Sheets

```
{
    "top":20,
    "skip":0,
    "search":"200 Series",
    "orderBy": {
            "path":"changedOn",
            "descending":true,
            "type":null
    },
    "select": [
            "equipmentId",
            "changedOn",
            "clientId",
            "status",
            "attributes",
            "image",
            "internalId",
            "description",
            "manufacturerId",
            "manufacturerName",
            "templates",
            "modelId",
            "modelName",
            "lifecycle",
            "operatorId"
    ],
    "attributes": [],
    "filter":{
            "filters": [{
                        "operator":"IN",
                        "values":["2","4","5"],
                        "path":"lifecycle"
            },{
                        "operator":"IN",
                        "values":[
                                    "145D03AE7ABC45889F9B84B0EE45BF03",
                                    "091CE2A87F044FD68C4607D3D9E203E3"
                        ],
                        "path":"operatorId"
            },{
                        "operator":"IN",
                        "values":["2"],
                        "path":"status"
            }],
            "and":true
    }
}
```

FIG. 8

```
this.relationships = [
  [ { table: "sap.ain.metaData::Equipment.Header", key: "ID" }, { table: "sap.ain.metaData::Workorder.Header", key: "EquipmentID" } ],
  [ { table: "sap.ain.metaData::Equipment.Header", key: "ModelID" }, { table: "sap.ain.metaData::Model.Header", key: "ID" } ],
  [
    { table: "sap.ain.metaData::FunctionalLocation.Header", key: "ID" },
    { table: "sap.ain.metaData::Workorder.Header", key: "FunctionalLocationID" }
  ],
  [ { table: "sap.ain.metaData::Notification.Header", key: "EquipmentID" }, { table: "sap.ain.metaData::Equipment.Header", key: "ID" } ]
]
```

FIG. 9

```
{
  "ids": [
    "76D1AB8E701D4E048E3ABA268ED36A33"
  ],
  "source": "equipment",
  "target": "notification",
  "filter": {}
}
```

FIG. 10

```
Map {
  'sap.ain.metaData:Equipment.Header' => 'sap.ain.metaData:Notification.Header',
  'sap.ain.metaData:Workorder.Header' => 'sap.ain.metaData:FunctionalLocation.Header',
  'sap.ain.metaData:Model.Header' => 'sap.ain.metaData:Equipment.Header',
  'sap.ain.metaData:FunctionalLocation.Header' => 'sap.ain.metaData:Workorder.Header',
  'sap.ain.metaData:Notification.Header' => 'sap.ain.metaData:Equipment.Header'
}
```

```
{
  "ids": [
    "76D1AB8E701D4E048E3ABA268ED36A33",
    "1D820B82D9004CA79FB871C5D22FB626",
    "FA115FE25BC94294A515D28C85BE7F23",
    "A74DAFC4DDBC4A12A347B7E931AE3373",
    "1A97FA34C468473F9A2976D8A6864E3B",
    "44768F8215E3482CBEBBF34AAB3C5DF8",
    "76ECCC1FF2A741E5A649C0B07C7AF114",
    "79F6E0A9139D4FB7A74DE2FB4D145E1C",
    "485DBF47CAEA4E6AB30FB7A54928DE4B",
    "1AEB783E2FFE43358603CCFEE4304445",
    "3F1E795518C346AE847EFF5276F76B56",
    "5CFDD0C094634570847DD2D7BEEA0FAD",
    "90826ECEFA74EFE84FCF11BD6ADC9D8",
    "F1081761DB1A462B93C993466F2372E2",
    "2FC1EE1FBF5C4DA7BC07BB15998514E0",
    "7D6C2AB596B44BCAB388D16FF8B52A92",
    "9FC168A53EA5467FBA7825D3FF07A838",
    "FFA3BFA9D6D34C049C58007BFD7C9225",
    "5F8BF1EA1F1148D097972A9DF3E69E96",
    "8C8D8DB884784944AF05CC40B0DA10D9",
    "F7538159730746IFA4003B75E006BFD2",
    "61A223DF76CE40B6960CA3EDCDCB19F1",
    "F31C7F63552D4A4B8D5E0B1E519C2D0A",
    "D2602147691E463DA91EA2B4C3998C4B",
    "31E86C873C674493BA3308AFCCA927F7",
    "53622405F32145C7A01ABE38C4D63F07",
    "863D43268AD842C9A23579C1EDF41283",
    "7978A4E7BCF8411F8C513A7CC93A9E5F",
    "7978A4E7BCF8411F8C513A7CC93A9E5F",
    "CA1305349CE045DE93A9CBFD5026F575",
    "863D43268AD842C9A23579C1EDF41283"
  ],
  "source": "equipment",
  "target": "notification",
  "filter": {},
  "odata": {
    "path": "EquipmentList",
    "params": "$skip=0&$top=2147483647"
  },
}
```

FIG. 13

```
{
  "id": "com.sap.pdms.ipro.work-activity",
  "name": "Work Orders",
  "description": "Provides a list of current work orders with details.",
  "imageUrl": "sap-icon://activity-2",
  "serviceUrl": "/ipro/work-activity",
  "interactive": true,
  "serviceType": {
    "id": "com.sap.pdms.InsightProvider"
  },
  "capabilities": [
    "multi-equipment",
    "single-equipment"
  ],
  "options": {
    "metadata": {
      "appId": "sap.pdms.workactivity",
      "businessServiceId": "com.sap.dsc.iam.pdms",
      "scopes": [
        "workactivity_AppAccess",
        "workactivity_ConfigAccess",
        "workactivity_DataRead",
        "workactivity_DataWrite"
      ]
    },
    "url": "https://dca-test-iam-flp-iam-test.cfapps.sap.hana.ondemand.com/cosmsappdmsib/cosmsappdmsib/platform/service-catalog/api/v1/service-entries/com.sap.pdms.ipro.work-activity"
  }
}
```

Standard ∨  | Search 🔍 | Global Filter | Explore | Packages

1400

Equipment Condition (30)   Pumps (DE) ∨

| Equipment | Customer | Location | Health Status | Bearing Temperature (°C) | Inflow Temperature (°C) |
|---|---|---|---|---|---|
| ☐ Pump 00356 | Customer DF | Location 8ZT | Critical | 155.89 | 54.78 |
| ☐ Pump 00224 | Customer ZU | Location 89J | Critical | 150.67 | 49.89 |
| ☐ Pump 78901 | Customer ASD | Location 2N | Critical | 148.67 | 47.45 |
| ☐ Pump 00123 | Customer GG | Location P | Critical | 143.89 | 47.89 |
| ☐ Pump 00867 | Customer GHK | Location O | Critical | 141.89 | 45.09 |
| ☐ Pump 00089 | Customer FT | Location Q | Warning | 139.56 | 38.45 |
| ☐ Pump 00456 | Customer GH | Location S | Warning | 135.67 | 40.90 |
| ☐ Pump 00001 | Customer FG | Location K | Warning | 134.89 | 34.90 |
| ☐ Pump 00867 | Customer GH | Location U | Good | 133 | 85 |
| ☐ Pump 00987 | Customer P | Location J | Good | 115 | 22 |

FIG. 14B

| Standard ∨ | Search 🔍 | | |
|---|---|---|---|
| 1402 ↗ Alert | Description | Severity | Created |
| ☐ Pump 805534 | | | |
| ☐ Alert_413 | Pipe Overheating | Error | 10 May 2019, 09:11:49 |
| ☐ Alert_423 | Bearing Overheating | Error | 12 May 2019, 09:11:49 |
| ☐ Alert_435 | Idle Warning | Warning | 12 May 2019, 09:11:49 |
| ☐ Alert_531 | Over Current Draw | Error | 15 May 2019, 09:11:49 |
| ☐ Alert_445 | Casing Vibrating | Warning | 15 May 2019, 09:11:49 |
| ☐ Alert_448 | Casing Vibrating | Warning | 15 May 2019, 09:11:49 |
| ☐ Pump 805521 | | | |
| ☐ Alert_569 | Bearing Overheating | Warning | 12 May 2019, 09:11:49 |
| ☐ Alert_309 | Raceway Spalling | Information | 15 May 2019, 09:11:49 |

| Technical Object | Criticality | Risk Score | Phase | Maintenance Phases / Tasklists |
|---|---|---|---|---|
| ∨ New Asford | | | | |
| ∨ Electrical System | A+ "Very High" | 90 | Fully Operational | ☉ 2  ⊙ 1 |
| ∨ Sanitary System | A+ "Very High" | | | ☉ 3  ⊙ 1 |
| ∨ IT Networks | B "Medium" | | | ☉ 1 |
| ∨ Meadows | C "Low" | | | |
| ∨ Meadows | B "Medium" | 78 | Partially Operational | |
| ∨ Susan Walker | B "Medium" | 76 | Partially Operational | |
| ∨ Blue Alpha | A "High" | 93 | Fully Operational | |
| | A "High" | 92 | Fully Operational | |

FIG. 15B

DATA FILTERING UTILIZING CONSTRUCTED GRAPH STRUCTURE

BACKGROUND

Unless otherwise indicated herein, the approaches described in this section are not prior art to the claims in this application and are not admitted to be prior art by inclusion in this section.

The evolving increase in size and scale of various types of complex systems, can require the participation of a number of various individuals with different skill sets, knowledge, and experience. For example, a reliability engineer be called upon to diagnose and correct problems arising from the faulty operation of one or more system components spread across a number of different physical sites, in order to keep a system up and running.

The reliability engineer may in turn provide instructions to one or more work center expert(s) dedicated to a particular worksite. The skill set and institutional knowledge of that work center expert may be more specialized, reflecting the narrower focus of his or her vocational duties.

Still other individuals may be responsible for planning operation of the complex system. Such planners may focus upon larger issues of supply chain management of essential components, and forecasting demands expected to be made upon the system in the near term, or the projected future.

Such complex operational environments can make it difficult to efficiently share accurate, updated information between different individuals. Moreover, the sheer volume of information relating to the complex system can be overwhelming, clouding the ability to accurately diagnose problems, and to respond quickly to correct those problems.

SUMMARY

Embodiments relate to (global, lateral) data filtering techniques which may be employed alone or in combination. A global filter allows data filtering using attributes of a data object across multiple Analysis Tools (ATs), through the broadcast of semantic filter context objects. Upon selecting attribute values as part of the global query, the filter context object with attribute data is created with attribute names and values. The filter context object is then resolved into a data object, and subsequently into target data by a processing engine. Passing the filter context object (rather than already-resolved Entity IDs) to the processing engine, reduces the payload and renders communication between services fast and efficient.

A lateral filter finds related entities in a relational database, without having to maintain and/or duplicate all of the data into a graph database. The processing engine resolves lateral filters using an entity graph path calculation performed in conjunction with the generation of a graph structure bootstrapped from available information. The bootstrapped graph structure is constructed utilizing available semantic data regarding database schematics (schematics). These may be a combination of pre-calculated—e.g., Primary Key (PK)/Foreign Key (FK)—relations between database tables, as well as other metadata read from the relational database. From that information, relationships in the bootstrapped graph structure are created. Possible paths taken between entities in the bootstrapped graph structure are used to generate an optimized SQL query to reach the target data. The bootstrapped graph can change dynamically based upon received schematics, thereby desirably reducing a size of the bootstrapped graph structure. Such a dynamic nature can be particularly beneficial when the bootstrapped graph structure spans multiple databases.

The following detailed description and accompanying drawings provide a better understanding of the nature and advantages of various embodiments.

BRIEF DESCRIPTION OF THE DRAWINGS

FIG. 8 shows an example of a semantic context filter object with attribute data.

FIG. 9 shows an example of pre-calculated relationships.

FIG. 10 shows an example of a payload lateral filter with global filter applied.

FIG. 11 shows an example of a graph representation in memory.

FIG. 12 shows an example of a payload lateral filter without global filter applied.

FIG. 13 shows an example of service registration with scope information.

FIGS. 14A-E show simplified screen shots of an interface for one use case.

FIGS. 15A-E show simplified screen shots of an interface for another use case.

DETAILED DESCRIPTION

Described herein are methods and apparatuses that implement data filtering. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
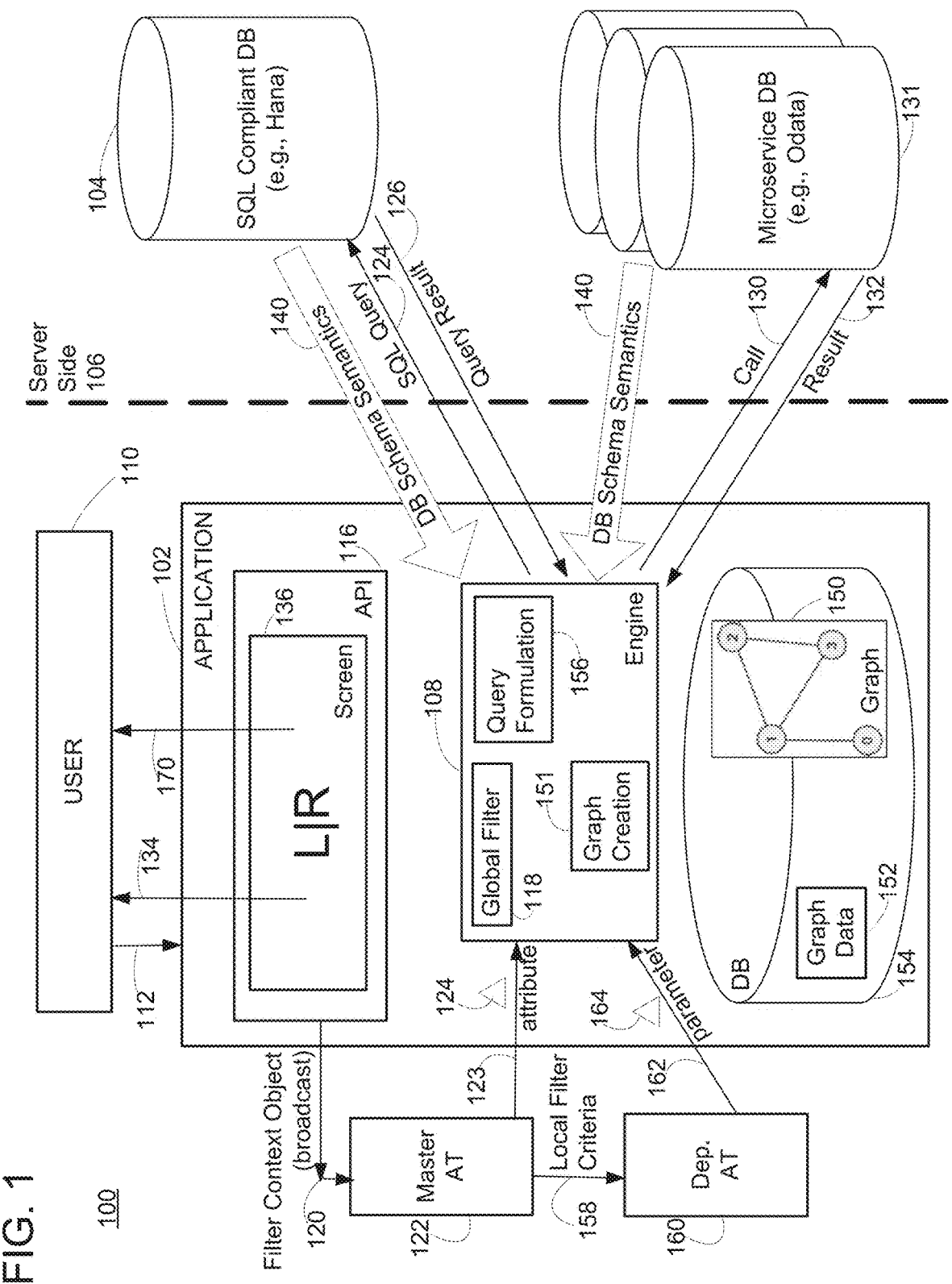
FIG. 1 shows a simplified diagram of a system according to an embodiment.

FIG. 1 shows a simplified view of system that is configured to implement data filtering according to an embodiment. Specifically, system 100 comprises a filtering application 102 that is in communication with a SQL compliant database 104 that is located on a server side 106.

The processing engine 108 of the application receives from a user 110, an input 112 regarding filtering of the data. This input is received at an Application Program Interface (API) 116.

Under some circumstances, the user instruction prompts a global filtering operation. The global filter allows the user to filter data using Business Object attributes across multiple analysis tools by passing semantic filter context objects.

Here, upon selection of attribute values, the global filter component 118 of the engine constructs a filter context object 120 with attribute names and values. This context object is then broadcast to all Analysis Tools, including the Master Analysis Tool 122.

The master AT then passes 123 the context object from master AT back to the engine. Based upon the attribute information in the context object, the engine issues a query 124 to the database, and receives in return target data in the form of a query result 126.

The engine may also make calls 130 (e.g., OData) to collect data from other databases 131, for example those referenced in connection with microservices. The result 132 of those calls is considered in performing the database querying operation.

Passing the context object to the engine (instead of already resolved Entity IDs), allows the size of the communicated payload 124 to be kept small. This aids in making communications between services fast and efficient.

The output 134 of the global filtering is communicated back to the user. This may be done by displaying the global filtering results on a screen 136, for example on the left hand side.

Under some circumstances, the user instruction prompts a lateral filtering operation. The lateral filter finds related entities in a relational database, without the cost of maintaining and duplicating all (voluminous) data into a graph database.

Here, upon selection of parameter values, the engine is configured to receive semantic information 140 regarding the schema of the database. This information can comprise pre-calculated relationships such as PK/FK linking tables of the database, as well as other metadata descriptive of the structure of the database.

The processing engine resolves lateral filters using an entity graph path calculation that is conducted in conjunction with the generation of a bootstrapped graph structure 150. The graph structure is constructed in a bootstrapped manner by a graph creation component 151, utilizing the available schematic information stored as graph data 152 in an underlying database 154.

From that graph data, a query formulation component 156 creates relationships in the bootstrapped graph structure. These relationships form the basis for the lateral filtering operation.

In particular, local filter criteria 158 are passed from the Master AT to a Dependent AT 160. The Dependent AT in turn communicates as input 162 to the processing engine, the parameter information including a payload 164.

Based upon this input and the bootstrapped graph structure, the query formulation component uses possible paths taken between entities to generate an optimized SQL query 124 to reach the target data. OData calls and results may also be made by the processing engine (e.g., as in the case of microservices).

It is noted that the bootstrapped graph can change dynamically based upon received schemantics (DB schema semantics). In particular the bootstrapped data structure can desirably reduce a size of the bootstrapped graph structure. Such a dynamic nature of the graph structure can be particularly beneficial when the bootstrapped graph structure spans multiple databases.

The output 170 of the lateral filtering is communicated back to the user. For ease of user recognition, this may be done by consistently displaying the lateral filtering results on a different part of the API screen—e.g., the right hand (R) portion of the screen as in the exemplary screen shots given below).

Figure 2:
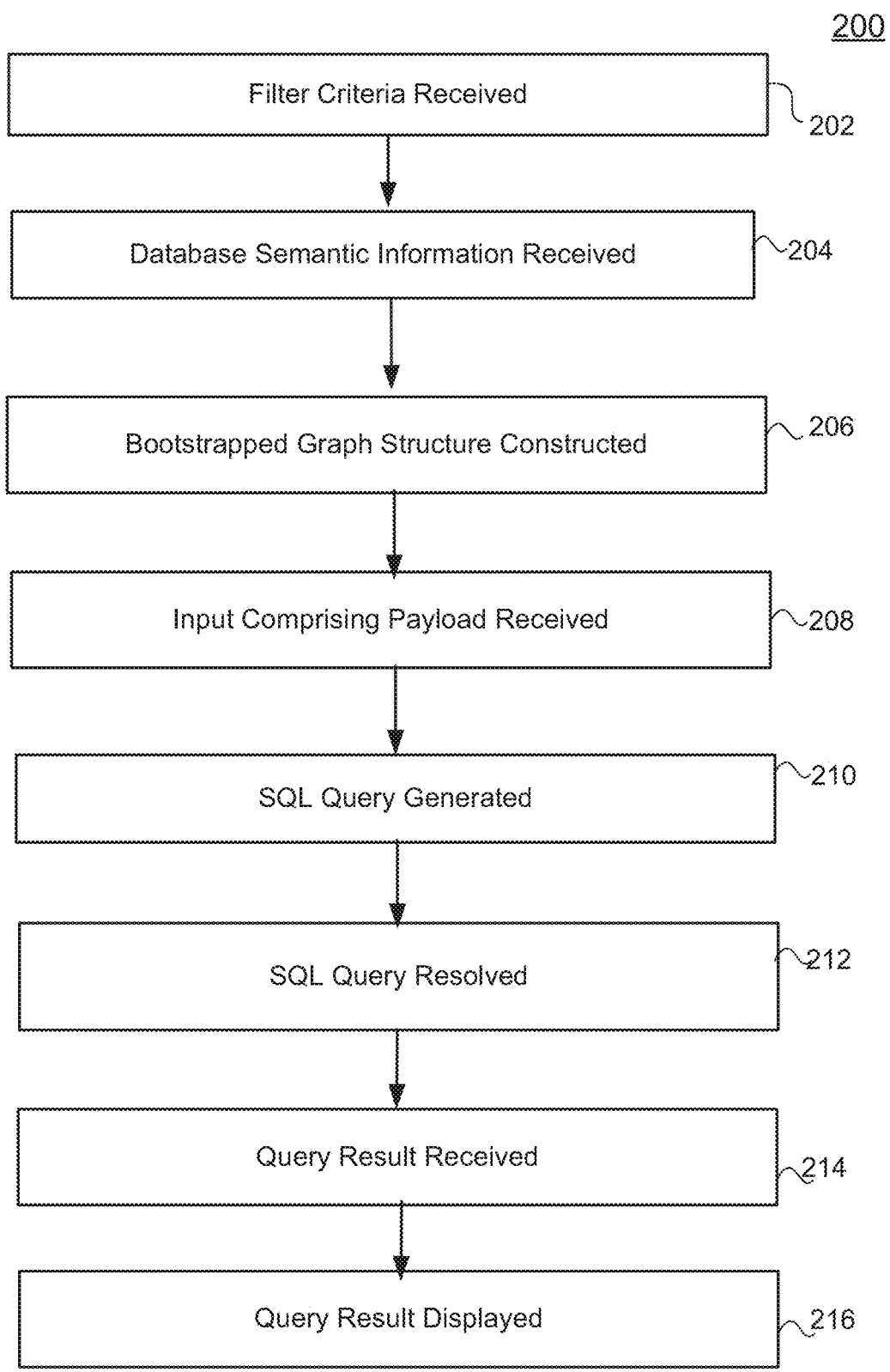
FIG. 2 shows a simplified flow diagram of a method according to an embodiment.

FIG. 2 is a simplified flow diagram of a method 200 according to an embodiment. At 202, a filter criteria is received from a first analysis tool, the filter criteria including an attribute of a data corpus stored in a database according to a schema.

At 204, semantic information is received from the database, the semantic information describing a hierarchy of the schema organized according to an attribute level and a parameter level.

At 206, the filter criteria and the semantic information are referenced construct a bootstrapped graph structure comprising entities and relationships.

At 208, an input is received from a second analysis tool, the input comprising a payload including a parameter.

At 210, the bootstrapped graph structure and the input are referenced to calculate paths between entities and relationships and generate a SQL query including the parameter. At 212, the SQL query is resolved against the database.

At 214, a corresponding query result including the parameter is received from the database. At 216, the corresponding query result is displayed to a screen of an interface.

Further details regarding the performance of data filtering operations according to various embodiments, are now provided in connection with the following example.

Example

SAP SE of Walldorf, Germany offers a suite of different data analytics applications that are available for different types of data. For example, Supply Chain Management (SCM) data may be available for interrogation through one application, while analysis of Intelligent Asset Management (IAM) data may be available through a different application in the suite.

Accordingly, SAP has developed the WORKBENCH application, which allow users to perform tasks using integrated data views. In particular, WORKBENCH can be customized and extended as per user needs, to assist in monitoring, exploring data views, creating evidence packages, and taking actions accordingly.

Figure 3:
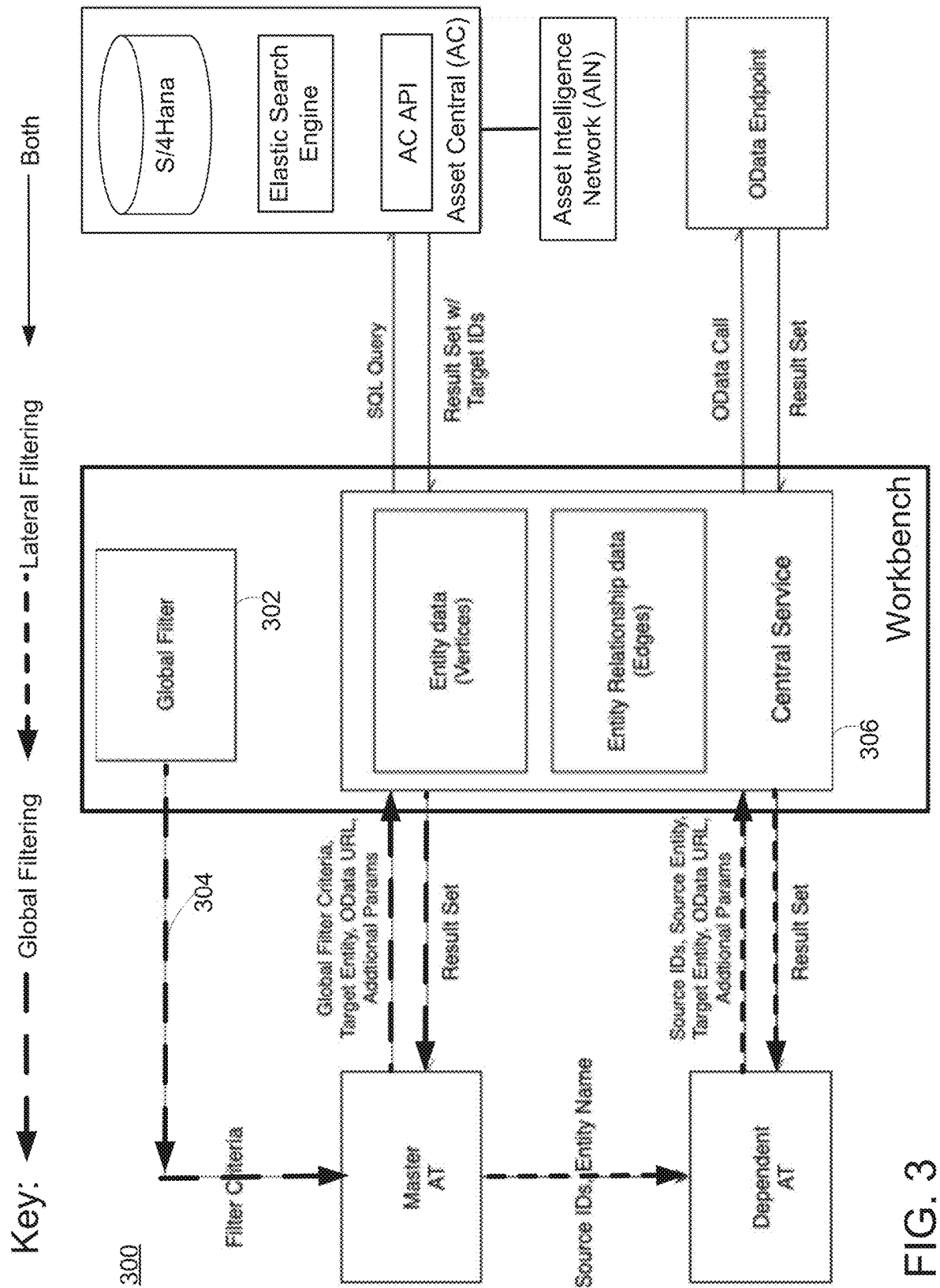
FIG. 3 depicts an architecture of an exemplary embodiment.

FIG. 3 depicts a simplified view of the architecture 300 of this exemplary embodiment. In particular, the WORKBENCH includes an infrastructure that allows data filtering to be carried out in two ways: ●global filtering, and ●lateral filtering.

Global filtering is shown by the global filter module 302 supplying global filter criteria 304 to the Master Analysis Tool (AT). A global filter bar of the global filter monitor includes fields such as Equipment (E), Model (M), Location (L), and their respective attributes. These can include custom attributes created by customer, as well as standard fields such as Class, Subclass and System.

Lateral filtering occurs from the Master AT to a Dependent AT. Lateral filtering will allow for filtering based on (E, M, L) IDs, and highlighting records on the right of a display screen, with a relationship shown on the left of the display screen. Exemplary screen shots are described later below.

The following assumptions and prerequisites govern filtering according to this example. First, Central Service 306 maintains information regarding at least the following:
Business Objects and their aliases as Vertices data
Primary Key—Foreign Key relationships between any two
    business objects as Edge data Lists of Equipment, Model and Location-related attributes and related Hana table Lists of Tables for Equipment, Model and Location business Objects where Custom Attributes and their data are stored A second prerequisite is that every AT has an OData Endpoint to retrieve the required data based on object IDs. A third prerequisite is that the Central Service has direct access to DB tables (read-only).

The global filtering capability of this example is now described in detail. Specifically, the Global Filter allows the user to filter data using Business Object attributes across all analysis tools, by passing semantic filter context objects.

The Global Filter module utilizes the Asset Central (AC) search engine module which uses an inverted index data structure to store business object data. This data ingestion takes place on creation, update, and deletion of business object instances in real time using separate KAFKA topics for each entity. This data store contains business object data in the form of normalized JSON document which are also enriched with user defined attributes. The attributes and their values are available for querying in Global Filter toolbar through the Search Engine module. The inverted index data structure facilitates fast and efficient free text querying across the normalized document records.

The attribute query from the Global Filter toolbar is broadcast to all analysis tools in the form of a semantic context filter object through Context Broadcasting. FIG. 8 shows an example of a semantic context filter object with attribute data.

This filter object is resolved to business object ID. Then it is subsequently resolved to target data by the Central Service.

Details regarding context broadcasting according to global filtering, are now provided. Upon selection of attribute values in the Global Filter toolbar, a filter context object with attribute data is constructed in the background with attribute names and values. This context object is then broadcast to all the analysis tools which use the Central Service to obtain the target data.

Passing the context object to Central Service instead of already resolved Entity IDs, allows the payload size to be kept small. FIG. 10 shows an example of a payload of a lateral filter with global filter applied. FIG. 10 may be contrasted with FIG. 12, which shows an example of a payload of a lateral filter without global filter applied. The smaller payload results in fast and efficient communication taking place between services.

Central Service communicates with the AC Search Engine module to resolve the context object to business object/Entity IDs. This information is then subsequently used to obtain target data. This particular example shows the AC search engine operating on the AC Hana in-memory database storage platform.

Figure 4:
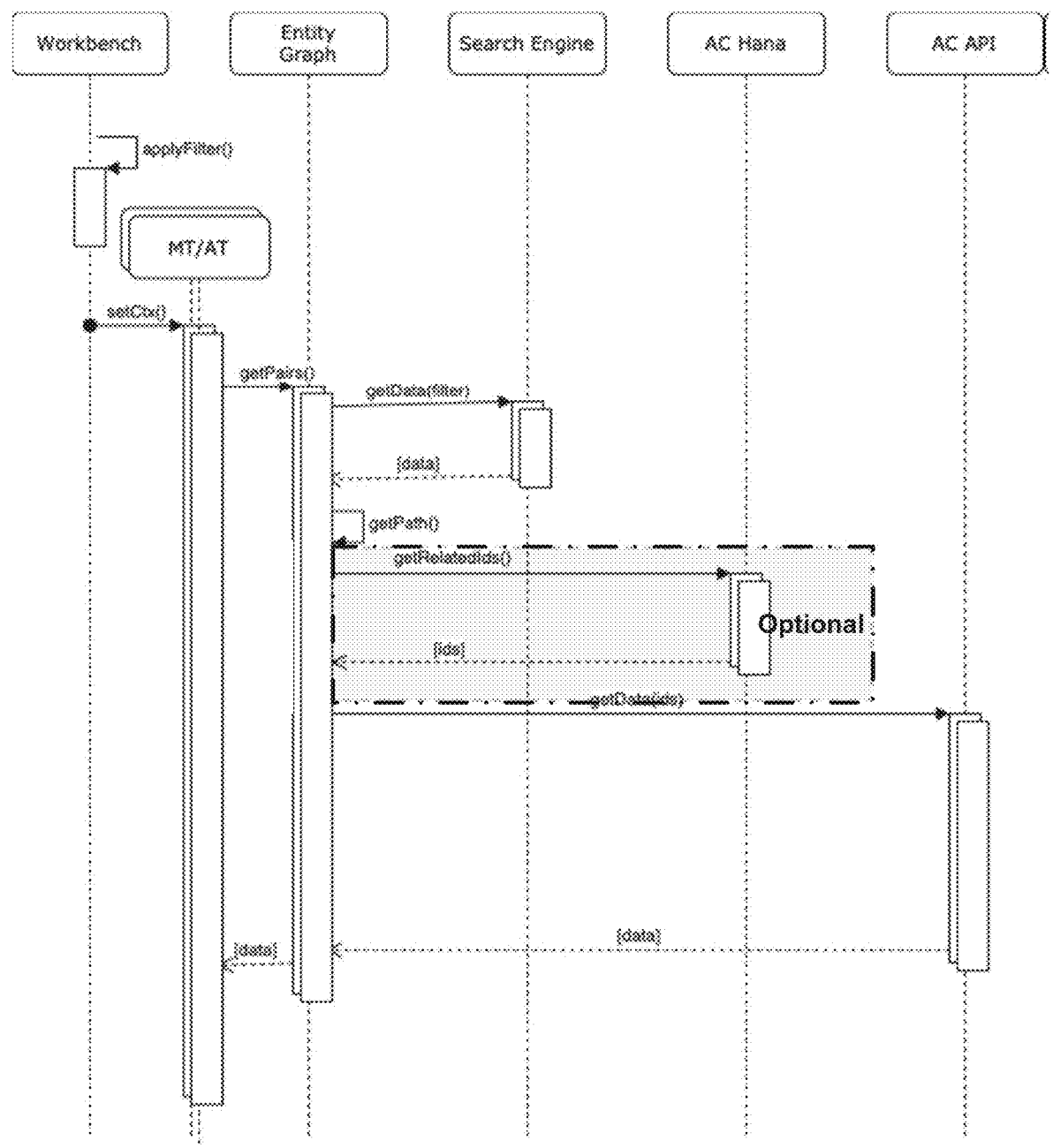
FIG. 4 shows a sequence diagram of a global filter according to the example.

FIG. 4 shows a sequence diagram of a global filter according to the example.

1. Global Filter context object is passed from filter bar to all ATs, which in turn passes it to Central Service along with the target object type, OData URL which can be used to get the result set, and any additional parameters.
2. Central Service uses the filter context object to get Entity data from the Search Engine module.
3. The resolved Entity data can then optionally be used to get Target Entity ID data if the Target Entity is not indexed by the Search Engine.
4. Central Service then makes an OData call to get Target Result Set using the Target ID data and OData URL from the first step. The result set is then passed back to requesting AT.

The performance of lateral filtering according to this example, is now described. In particular, the Lateral Filter finds related entities in a relational database without the need of maintaining and duplicating all data into a Graph Database.

The processing engine that finds related entities according to lateral filtering, is based on an in-memory, loose, unweighted, and undirected graph. The graph represents the relationship of entities in a relational database and it can span multiple relational databases (e.g., a mesh structure).

1. Each entity/table in the relational database represents a node in the graph
1.1 Since not every individual object's relationship is mapped but the relationship of the whole entity, the graph becomes very loose which optimizes compute time later on
2. Vertexes connect related entities
3. Since relationships are defined in both directions in a relational database, the graph is undirected The graph structure is dynamically bootstrapped using a combination of pre-calculated relations. FIG. 9 shows an example of pre-calculated relationships according to this example.

The bootstrapped graph structure is based on the metadata read from the relational database. That metadata defines how tables are linked with each other based on Primary Keys and Foreign Keys. Based upon this information, relationships are built.

Bootstrapping of the graph can happen dynamically. Such dynamic creation can be based upon the received input database schema semantics (schemantics) in order to further reduce graph size. This is especially beneficial when the graph spans multiple databases.

Figure 5:
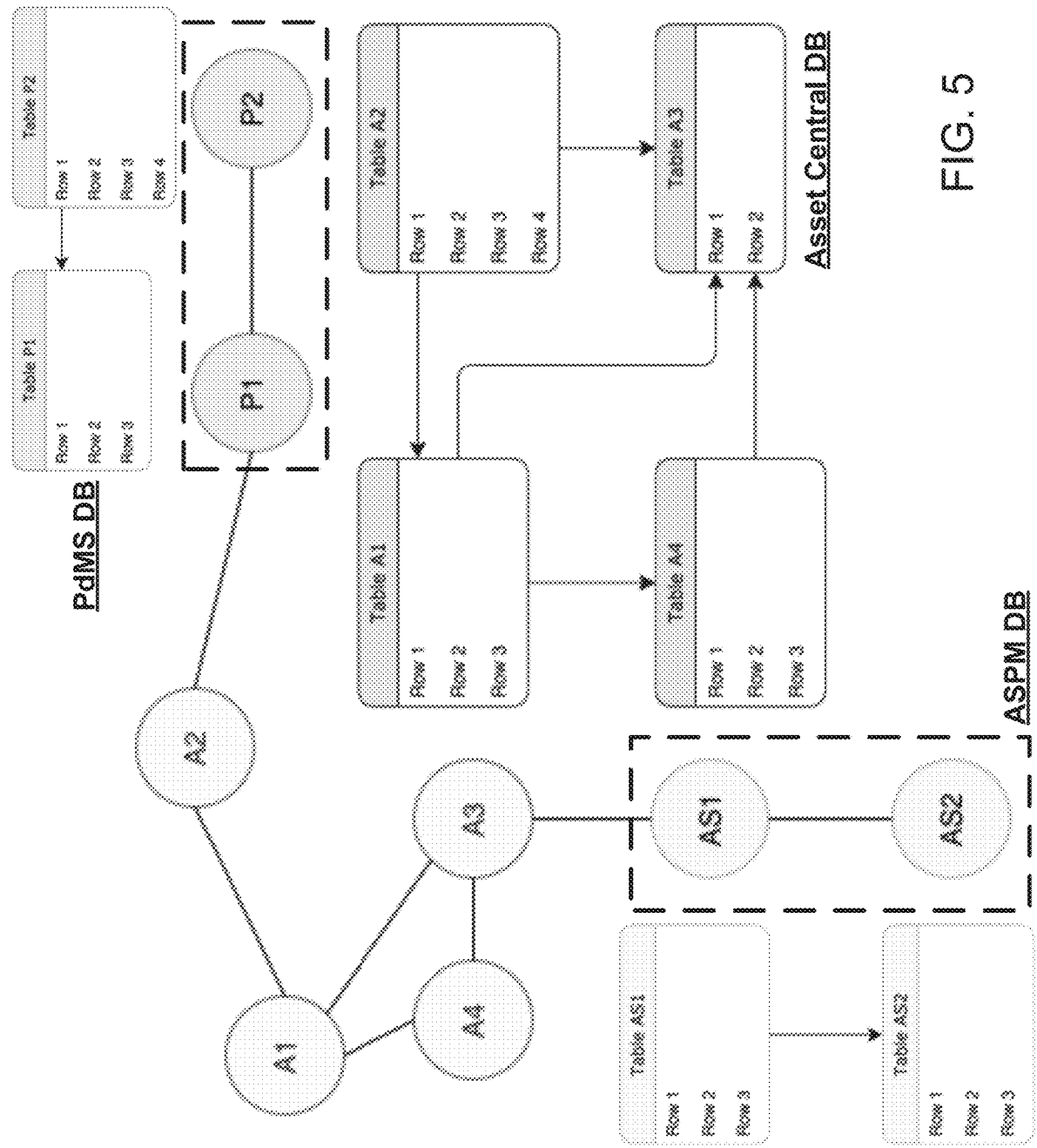
FIG. 5 shows a simplified view of a graph structure representing tables of different databases.

FIG. 5 reflects the schemas of the databases of three (3) different SAP products that are relevant to asset management:

Asset Central Database (DB Tables A1-4)
Asset Strategy and Performance Management (ASPM) Database (DB Tables AS1-2)
Predictive Maintenance & Service (PdMS) Database (DB Tables P1-2).

Based upon these DB schemas, the corresponding bootstrapped graph structure is also shown in FIG. 5.

Graph bootstrapping optimization is now discussed. Based on the received input semantics, it may be known that some areas of the graph will not be required. For example if the graph spans entities from two (2) databases D1 and D2, but the input semantics all stay within D1, then D2 does not need to be included in the Graph.

The building of an optimization SQL statement is now described. Based on the received input semantics and the bootstrapped graph, embodiments utilize different pathfinding procedures to find relationships between entities. A particular embodiment may utilize Dijkstra's algorithm for this purpose, but other procedures can be used that are able to handle a graph that contains circles.

This particular example may employ the following optimizations.

Figure 6:
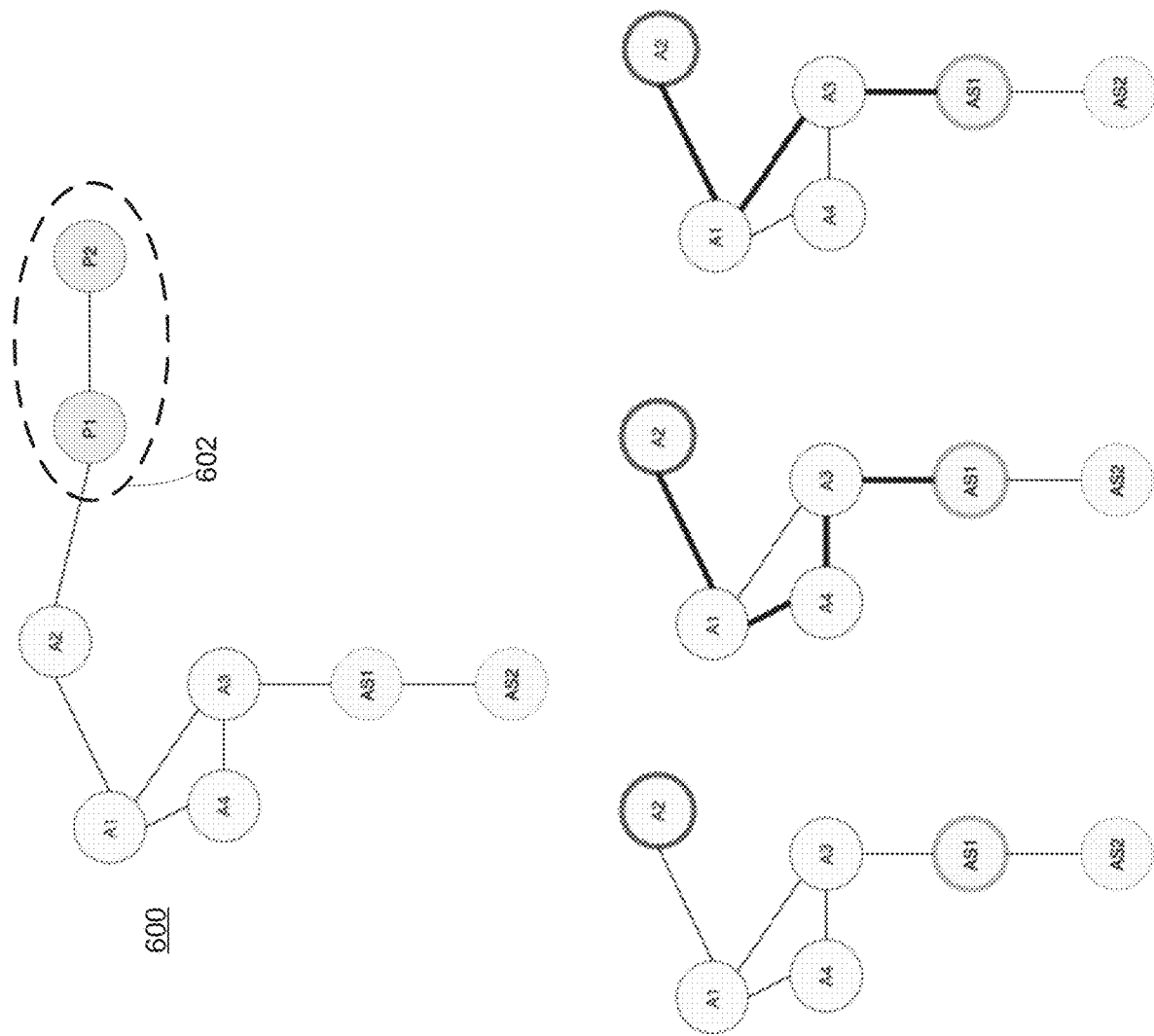
FIG. 6 shows a simplified view of the dynamic creation of a graph structure utilized in lateral filtering according to the example.

1. Not all found paths will be considered; if we only want direct relationships, we remove paths with a distance>1.
2. SQL Statement will be split depending on the region of the required entities since a single statement can only be executed with entities in the same database 3. Using SQL aliases to reduce the SQL Statement size in bytes 1.1 Example: SELECT column_name(s) FROM table_name AS alias_name;

The following example demonstrates how related entities between AS1 and A2 would be found. The top of FIG. 6 shows the original bootstrapped graph structure 600. Based on the input semantics we can remove the area 602 from the graph, since that part of the graph is needed to find related data.

A path finding algorithm will be run on the reduces graph to find all possible paths connecting both entities. FIG. 11 shows an example of a graph representation in memory. Once those paths are identified, a SQL Statement will be built dynamically.

The embodiment according to this example may allow for the enriching of information. Such data enrichment may be useful in that not all information is stored in the relational database, and also some properties might be calculated on the fly.

Accordingly, WORKBENCH supports enriching the information returned from the database by doing additional API calls. The required API calls are part of the input schematics. The specified. URL endpoint will be queried with the returned Ids from the database. Information returned from those API calls will be blended in our service with data from the database before everything gets bundled into a ResultSet and sent to the client.

Figure 7:
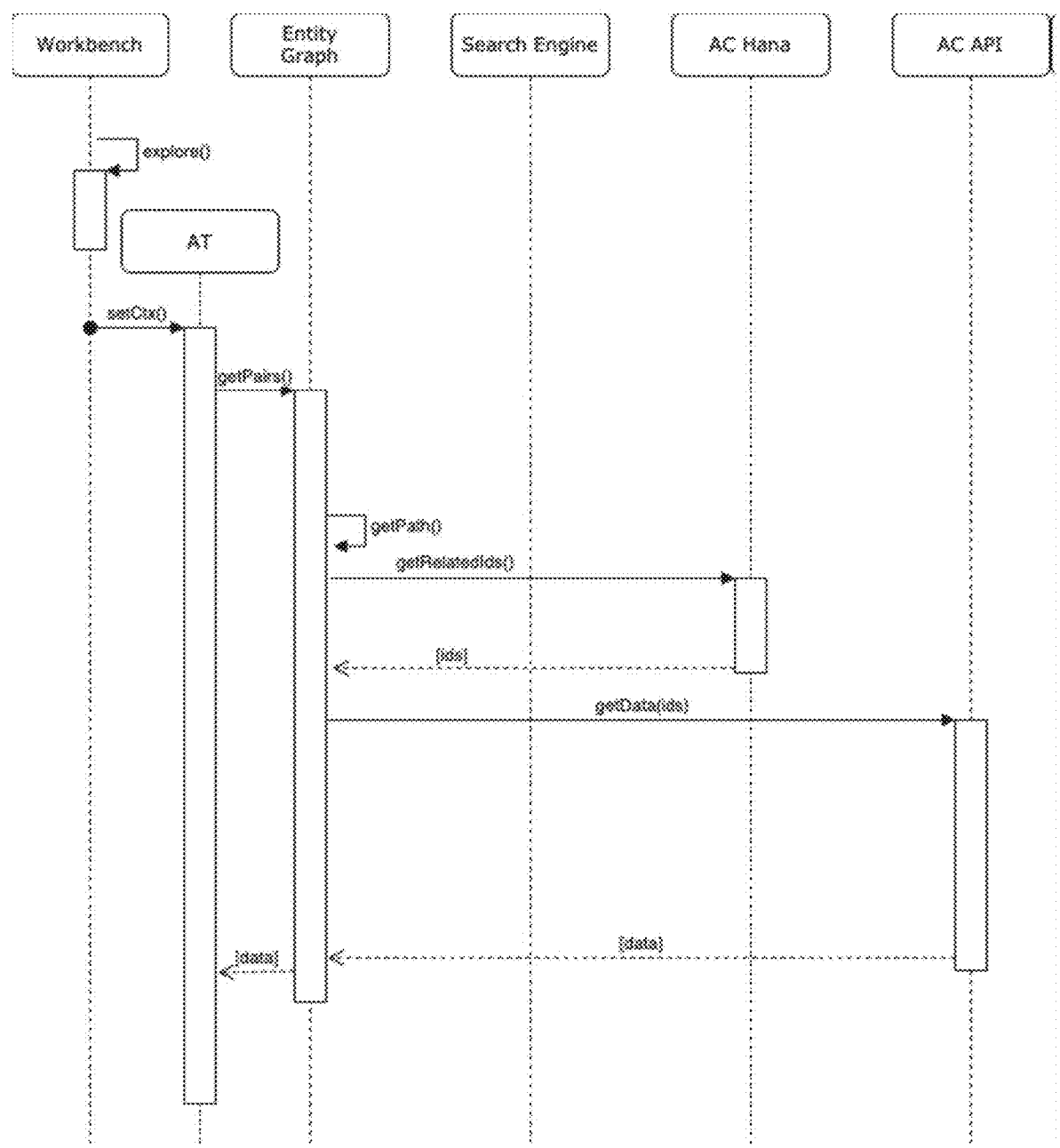
FIG. 7 shows a sequence diagram of a lateral filter according to the example.

FIG. 7 shows a sequence diagram of a lateral filter according to the example.
1. The Master AT passes the Source IDs (Master Analysis Tool object IDs) and Source Entity Alias to the Dependent AT.
2. Dependent AT then sends a request to Central Service with following input semantics:
2.1 Source IDs
2.2 Source Entity Alias
2.3 Target Entity Alias
2.4 OData URL to retrieve Target Result Set based on filters
2.5 Any additional params for the OData Endpoint
3. The Central Service uses the Source and Target Alias names and saved graph data (Entity table names and their relationships) to generate an Optimized SQL Query to get Target Object IDs.
4. These Target Object IDs and any additional parameters provided in Step 2, are used to get Target. ResultSet, which is then sent back to Dependent AT.

Authorization and sharing of data according to this example, is now discussed. The availability of Entity Data, and Actions for every AT in WORKBENCH, may be controlled per authorization scopes available for every user.

The OData Services used in the ATs and the Central Services internally use to user's authentication token to only return the data the user is authorized to view. The ATs limit actions available to the user, if the authorization token does not contain scopes defined in the service entry of the AT.

The WORKBENCH embodiment according to this example, supports the SAP Asset Intelligence Network (AIN) sharing mechanism. Specifically, a customer can invite a partner to view and perform actions upon asset data in WORKBENCH.

This is done by defining user groups in SAP Cloud Platform Cockpit. Then, those specific role collections with desired scope are mapped to these user groups. Customers can then create Users for their business partners in Asset Intelligence Network, and assign the Users to previously defined user groups.

The services used in WORKBENCH internally use Access Control List tables containing access data for each Entity. These are checked against the User authentication token to return data that an authorized partner is approved to access.

Service registration and discovery is available according to this example. Specifically, WORKBENCH uses Service Catalog to add and remove ATs from a user's workspace, which contains service registration information for each tool.

This service registration information is provided at the time of deployment by the AT, and it includes scope related information. FIG. 13 shows an example of service registration with scope information. An AT is available in the Service Catalog for a User if their authentication token contains the scope for that specific tool.

Creation and distribution of work packages according to this particular example, is now discussed. Records from any AT can be added to a work package to serve as part of evidence collection for future analysis and work order processing. Objects in a package may be present in various forms, including but not limited to:
a flat list,
a structured view for entity hierarchies, or
grouped by object type, class, location and more.

After creation, a work package can be assigned to other business objects. The work package can be used in follow-up processes, including but not limited to: creating improvement requests, notifications, or work orders.

Follow-up processes can relate to items in a work package and not to the package itself. Packages may also contain historical information, such as at time when a business object was added to the package, and any follow-up processes initiated related to the package.

While any user can create work packages, only those users with configuration access can view and process all the work packages in the system for a particular tenant. In addition to originating from WORKBENCH, work packages could also arise in other applications (such as other master-data applications like assessments). Work packages can also be further enhanced in other applications, before finally being processed in a package management application.

FIGS. 14A-E show simplified screen shots of an interface for one use case in an asset management environment. Here, the user is a maintenance engineer who seeks to determine how assets (e.g., pumps) are performing.

Figure 14A:
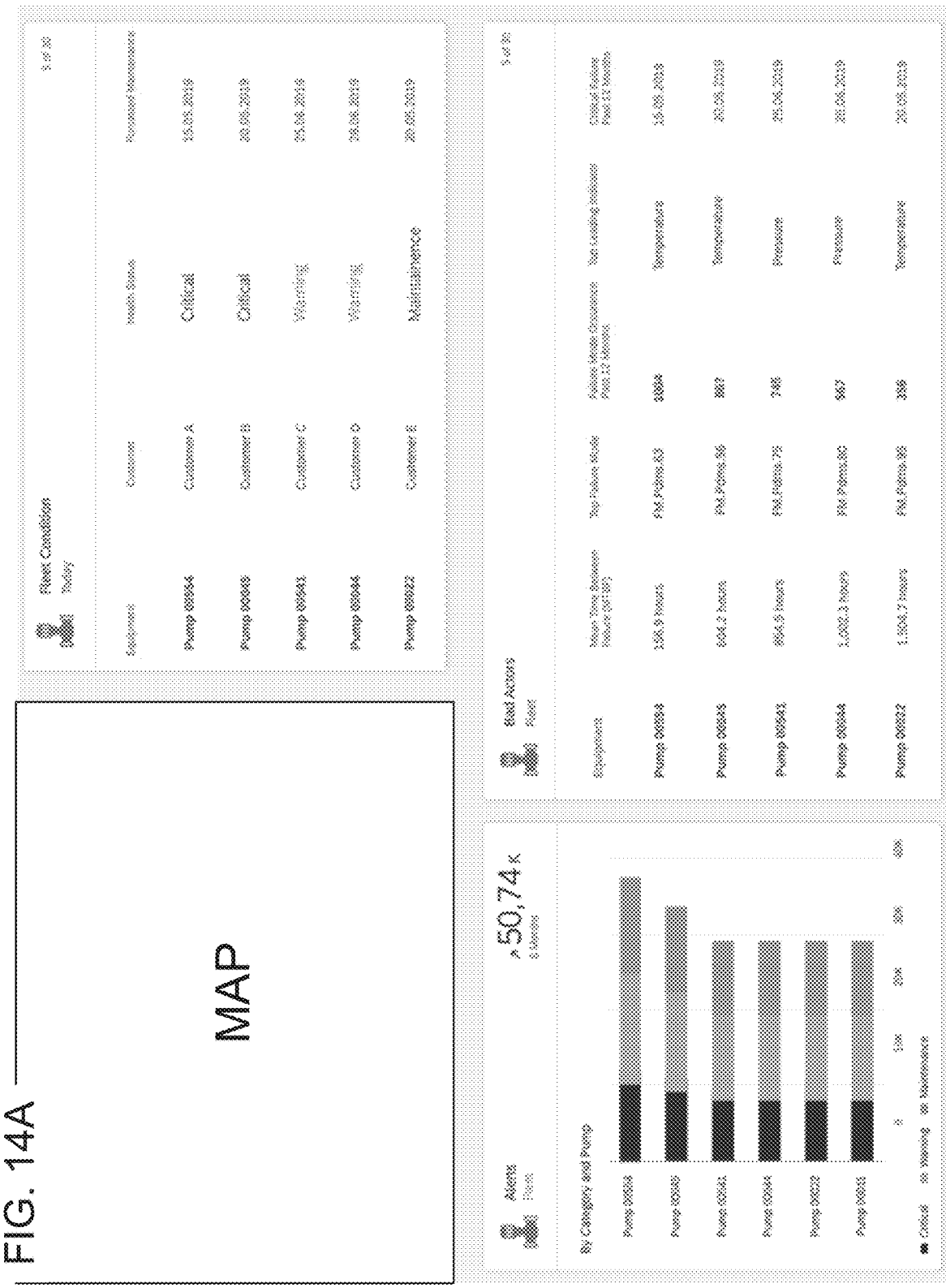

The maintenance engineer's home page is shown in FIG. 14A, which offers an overview regarding the current behavior of the assets. By offering separate cards for the ●Map parameter, ●Fleet Condition parameter, ●Alert parameter, and ●Bad Actor parameter, his home page allows the user to focus on the most important tasks of the day and react on the information quickly.

FIG. 14A shows a simplified view of the screen resulting from user selection of an Equipment Condition parameter. This screen offers detailed information regarding various pump assets.

FIG. 14B shows a simplified view of the screen resulting from user selection of an ●Equipment Condition parameter (represented by icon 1400). This screen offers detailed information regarding various pump assets.

FIG. 14C shows the screen resulting from a user selecting a different parameter icon 1402 in FIG. 14B. Here, the screen displays information regarding the ●Alert parameter.

Figure 14D:
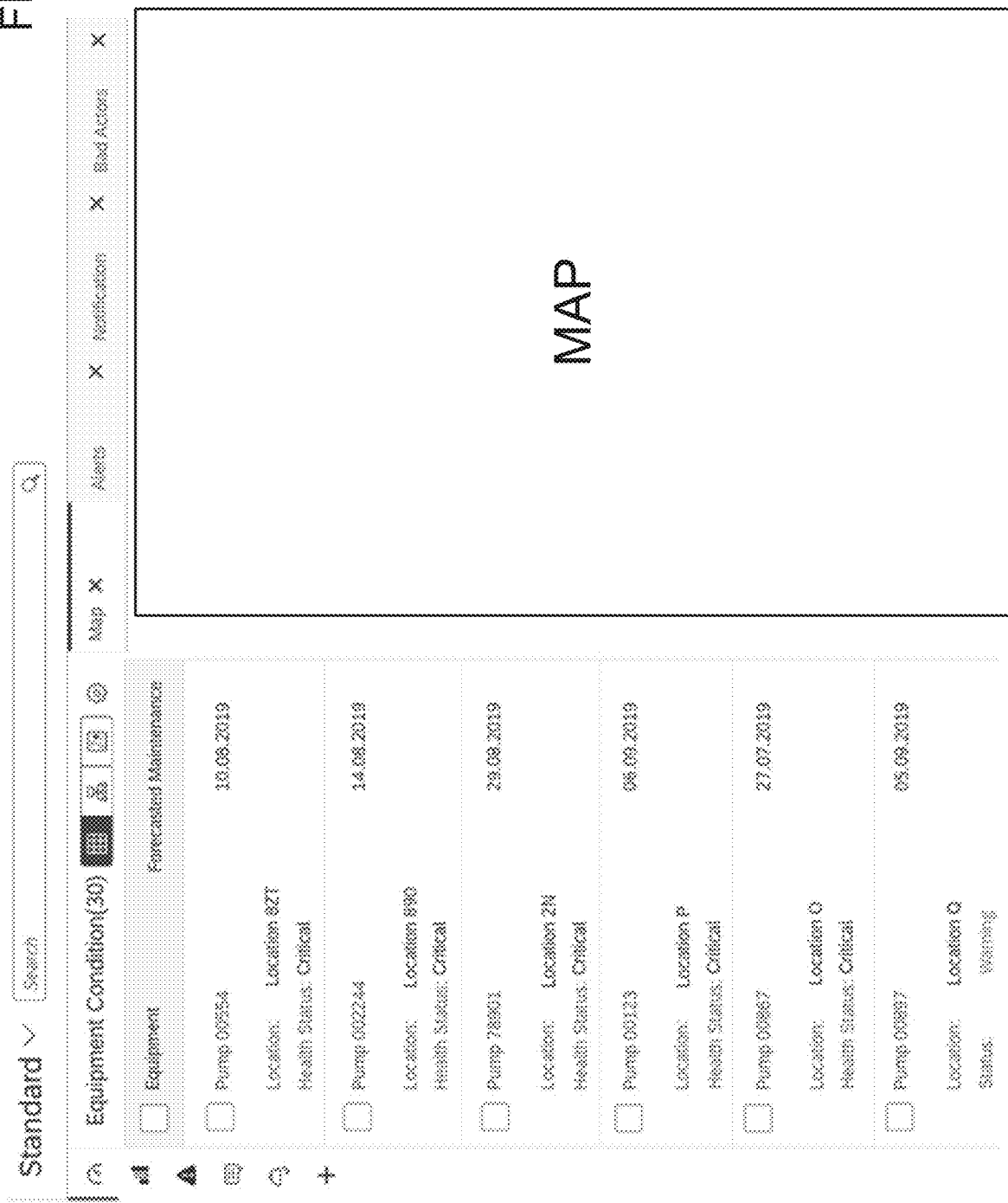

FIG. 14D shows the screen resulting from a user selecting the Explore button of the screen of FIG. 14B. This results in the left/right screen configuration, with the left screen showing the ●Equipment Condition parameter information, and the right screen showing the results of lateral filtering of that parameter data according to a ●Map sub-parameter.

Figure 14E:
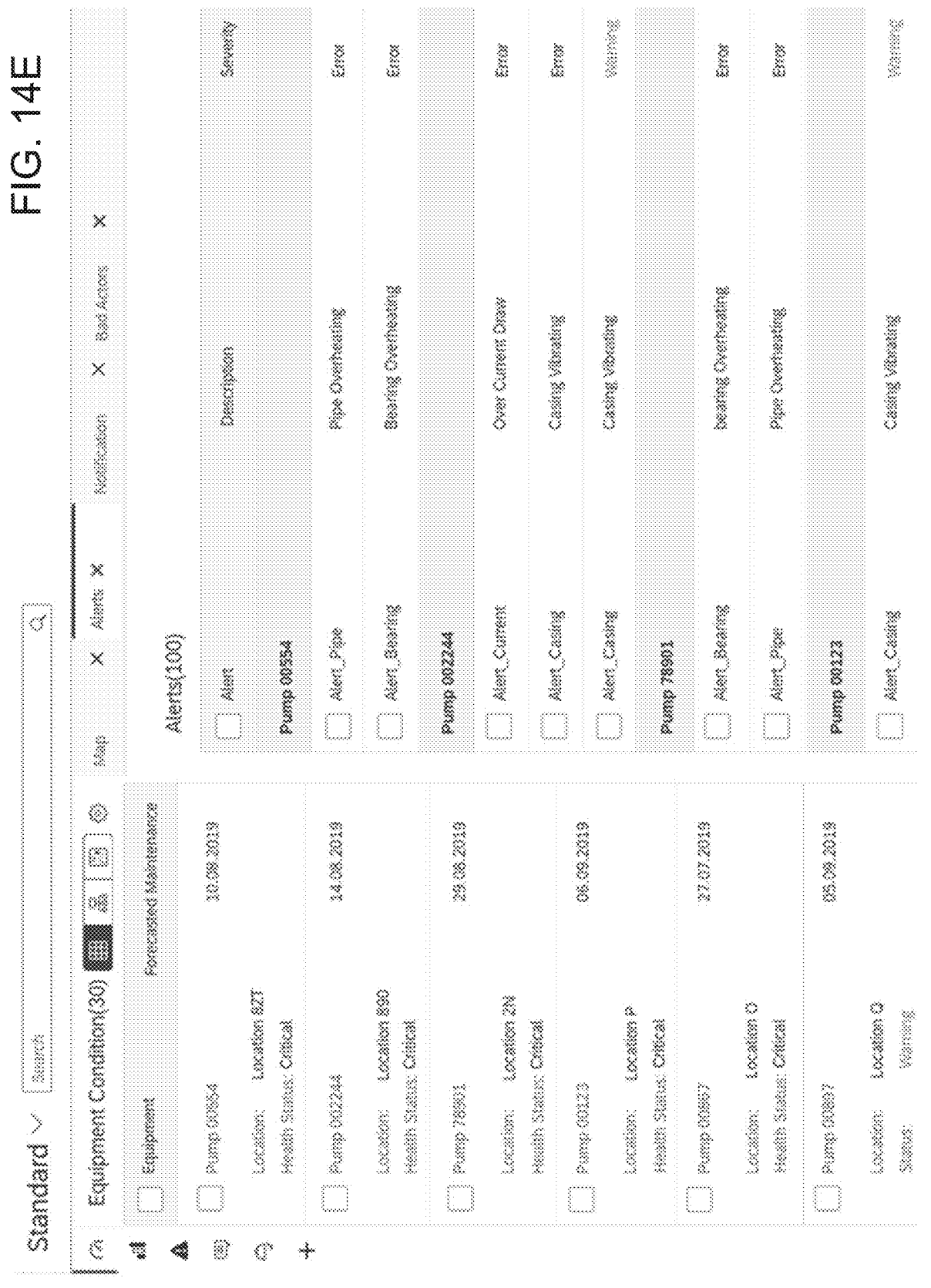

FIG. 14E shows the screen resulting from a user selecting instead the tab for the ●Alert sub-parameter for the ●Equipment Condition parameter. The lateral filtering results are shown in a map display on the right hand side of the screen.

FIGS. 15A-E show simplified screen shots of an interface for another use case in an asset management environment. Here the user is a maintenance planner, who seeks to inspect maintenance strategies for the (pump) assets.

Figure 15A:
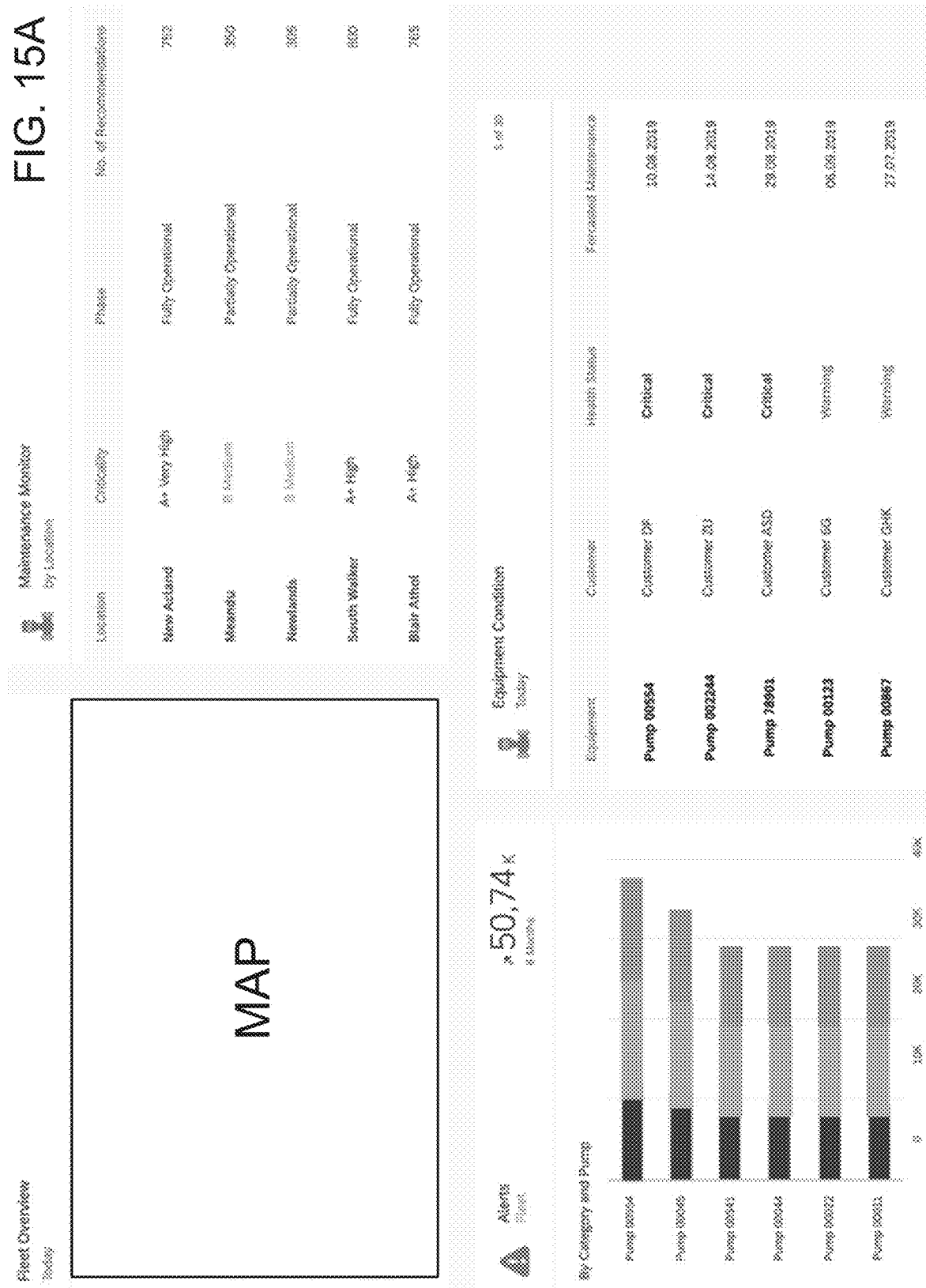

The maintenance planner's home page is shown in FIG. 15A, which offers an overview regarding the assets. By offering separate cards for the ●Maintenance Monitor parameter, ●Alerts parameter, and ●Equipment Condition parameter, his home page allows the user to focus upon the most urgent planning activities.

As shown in the screen shot of FIG. 15B, the ●Maintenance Monitor parameter (shown by the icon 1500) is a good place to start, because it affords the user direct access to assets demanding attention.

Figure 15C:
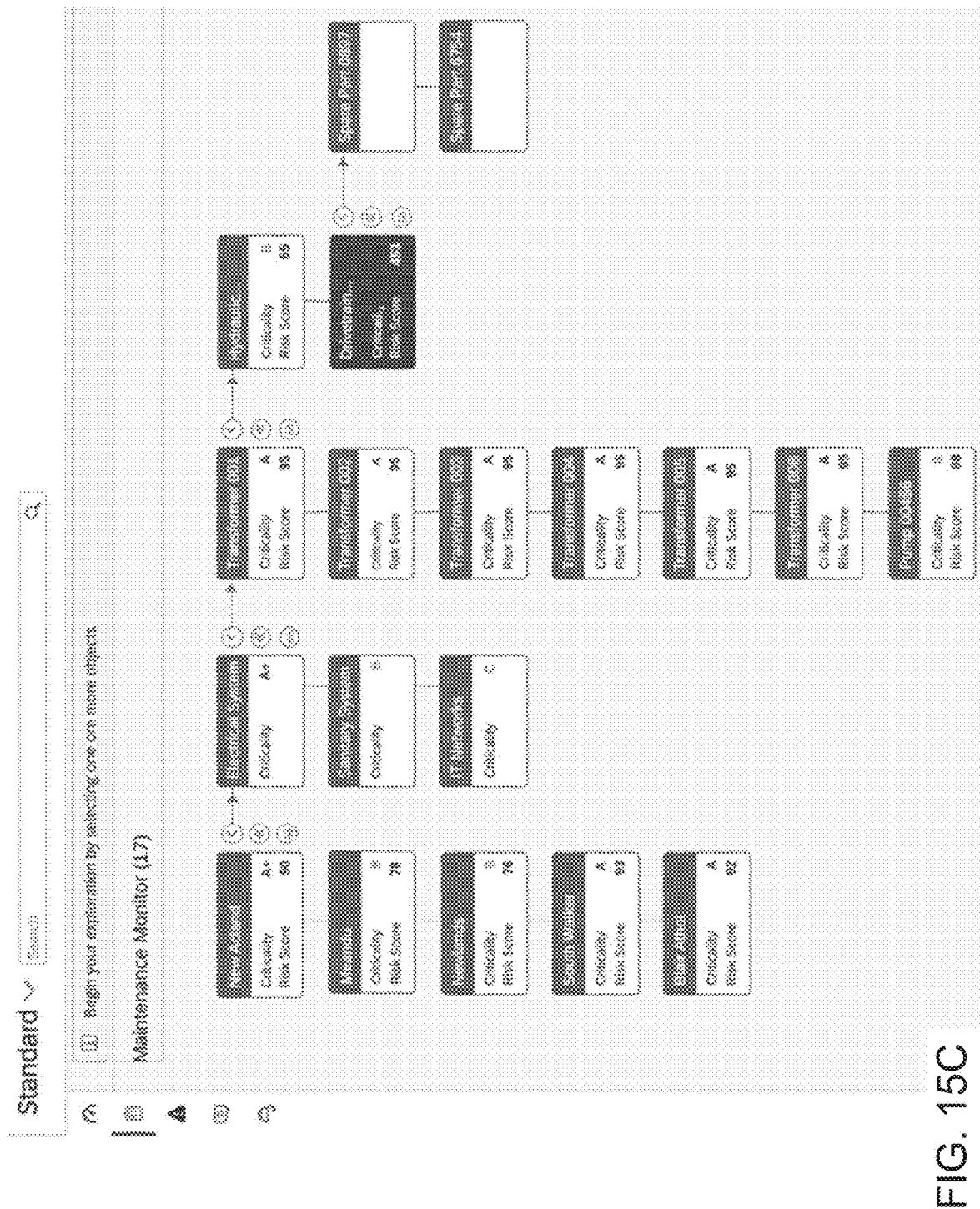

While the data tree of FIG. 15B is useful, embodiments may also display the information in different formats. For example, FIG. 15C shows the ●Maintenance Monitor parameter information displayed as a network graph instead.

Figure 15D:
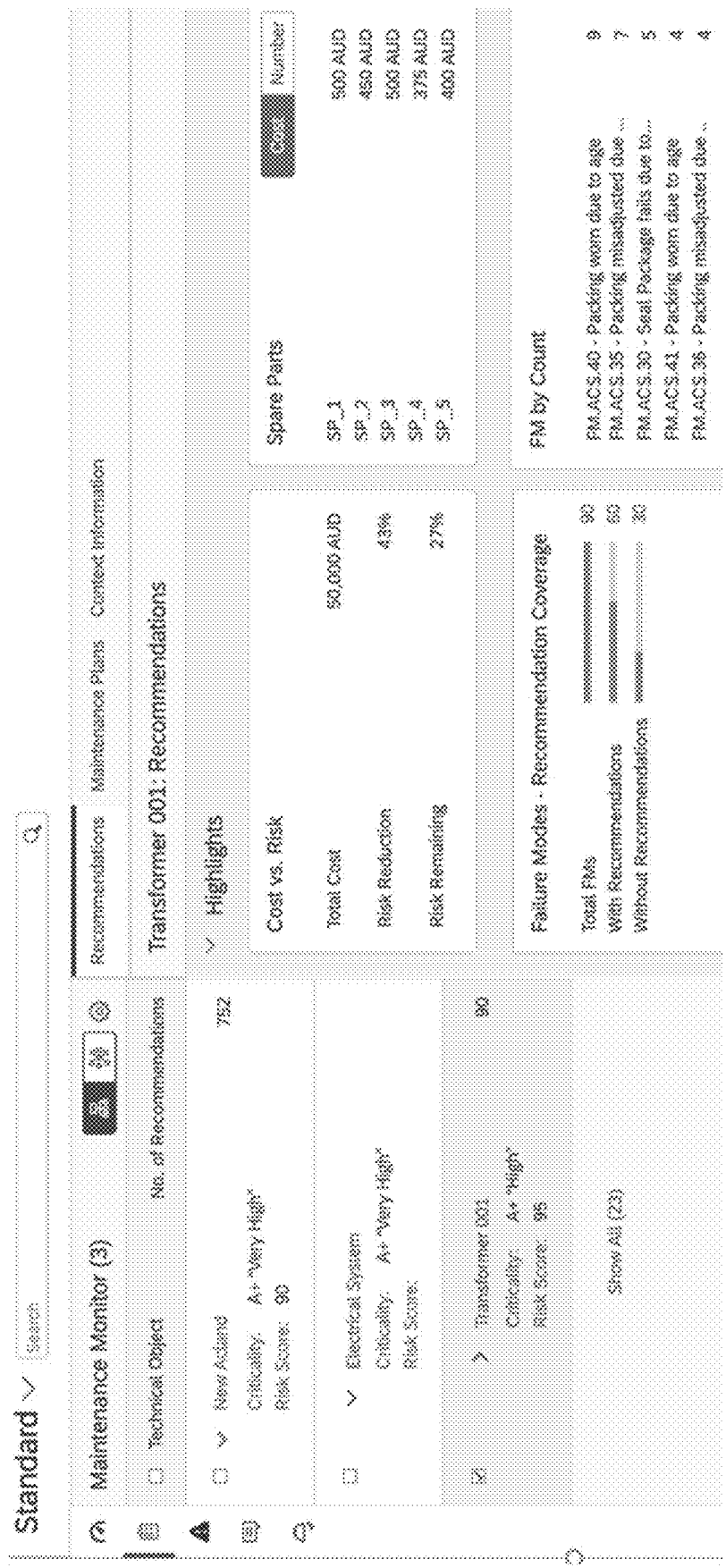

Selecting the Transformer 101 vertice of the network graph of FIG. 15C can again result in lateral filtering. In particular, FIG. 15D shows the result screen, where the left half of the screen comprises the ●Maintenance Monitor parameter, and the right half of the screen shows filtering results from the ●Recommendation sub-parameter.

Figure 15E:
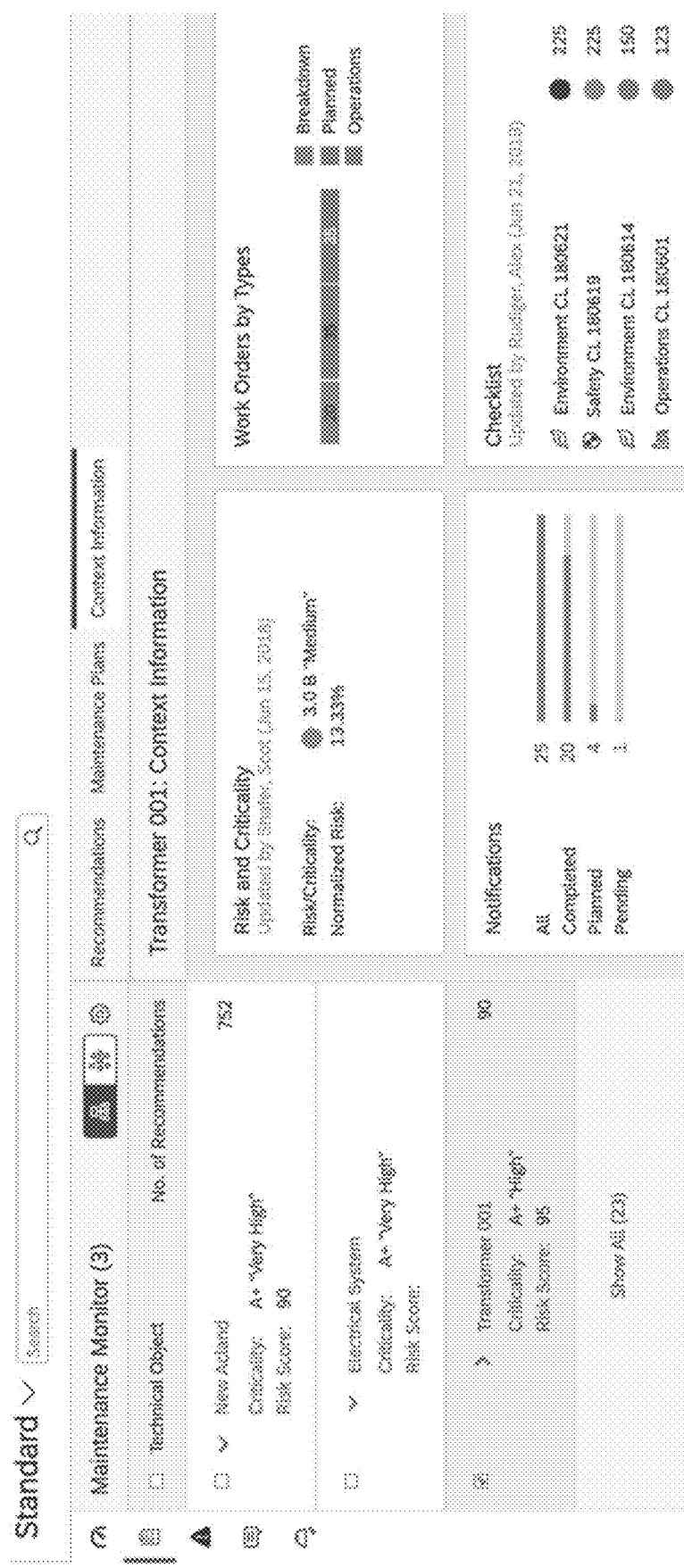

The screen of FIG. 15E shows the result of the user selecting the tab for the ●Context Information instead. Here, the resulting lateral filtering on the right hand side provides details regarding the context of the asset shown on the left hand side of the screen.

Returning now to FIG. 1, there the particular embodiment is depicted with the engine responsible for data filtering as being located outside of the database storing the graph data. However, this is not required.

Rather, alternative embodiments could leverage the processing power of an in-memory database engine (e.g., the in-memory database engine of the HANA in-memory database available from SAP SE), in order to perform various functions.

Figure 16:
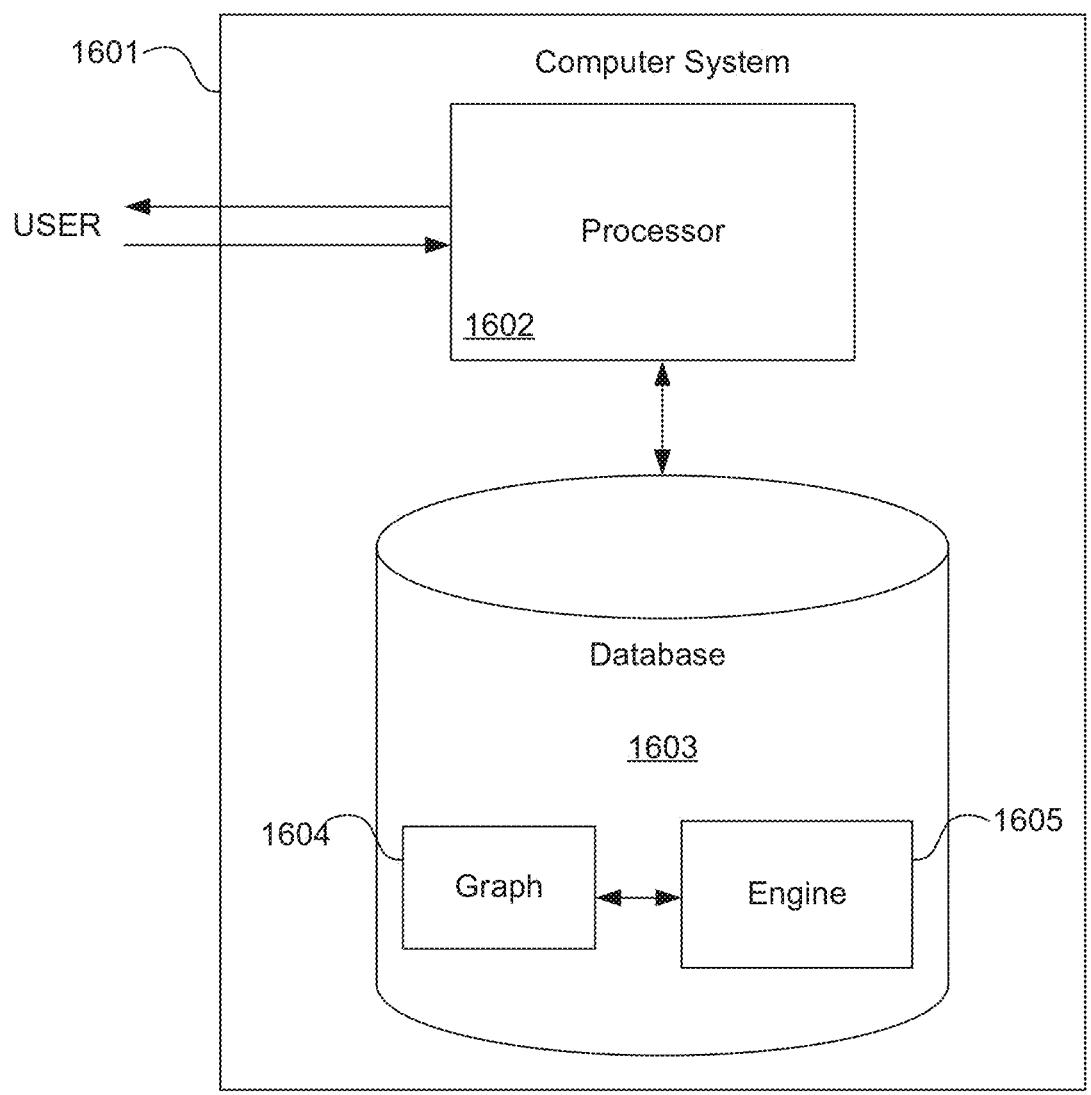
FIG. 16 illustrates hardware of a special purpose computing machine according to an embodiment that is configured to implement data filtering utilizing a graph structure.

Thus FIG. 16 illustrates hardware of a special purpose computing machine configured to implement content sharing according to an embodiment. In particular, computer system 1601 comprises a processor 1602 that is in electronic communication with a non-transitory computer-readable storage medium comprising a database 1603. This computer-readable storage medium has stored thereon code 1605 corresponding to an engine. Code 1604 corresponds to graph data. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Embodiments as described herein may offer certain benefits over other approaches. In particular, embodiments may bring together the data the user needs to perform the task in a modular, adaptable fashion, avoiding duplication of information. The user can extend the platform as per their needs by utilizing the various customizable options and the efficient user experience. Embodiments may also offer a modular workspace which can be customized by adding independent analysis tools with their configured variants, to visualize and compare data in order to perform detailed explorative analysis. The underlying filtering infrastructure allows users to quickly slice-and-dice data across various business objects and dimensions, and perform comparative analysis. Relevant artifacts can be packaged together and shared with other users to plan routines (e.g., maintenance) and to recommend further actions.

Figure 17:
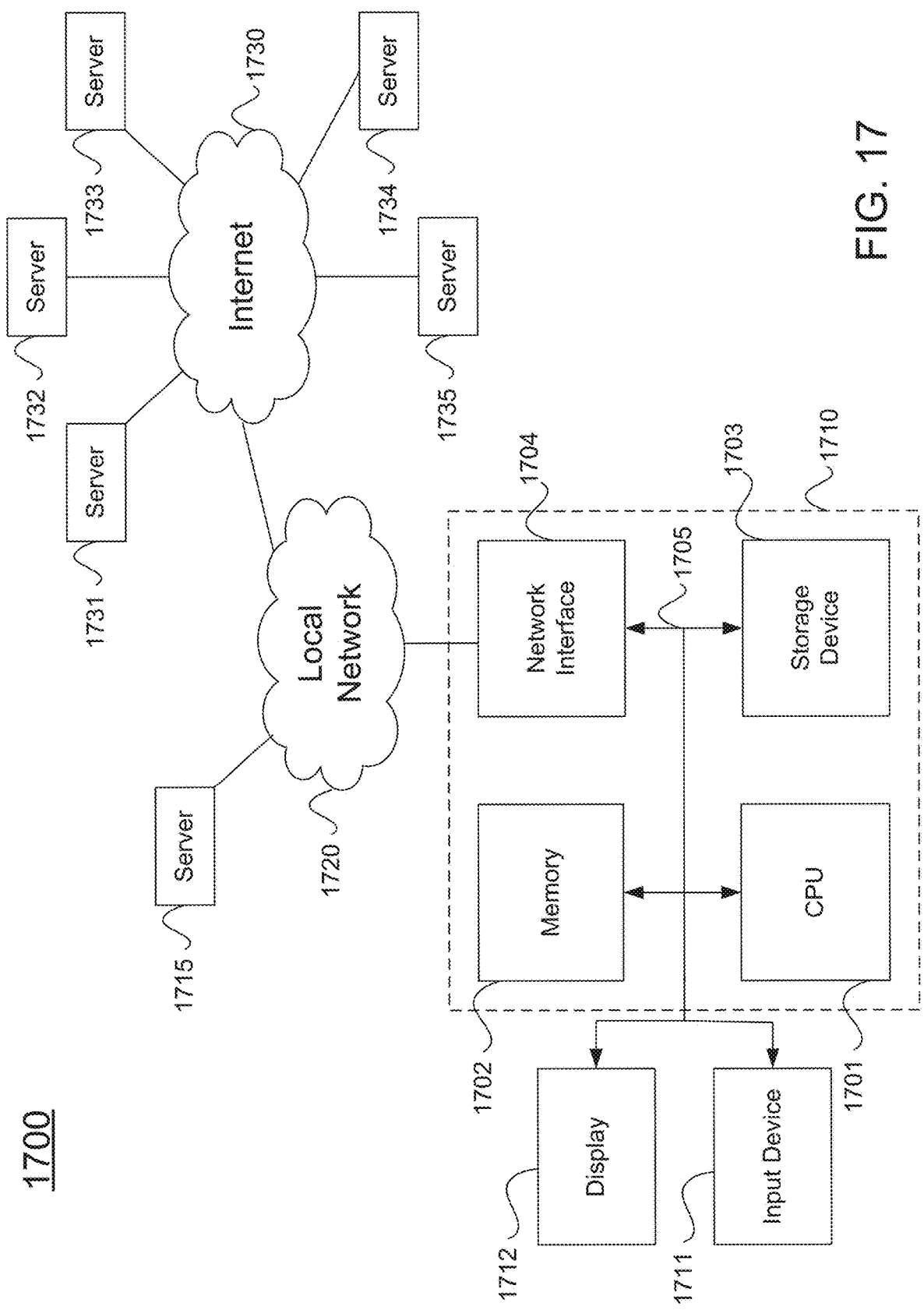
FIG. 17 illustrates an example computer system.

An example computer system 1700 is illustrated in FIG. 17. Computer system 1710 includes a bus 1705 or other communication mechanism for communicating information, and a processor 1701 coupled with bus 1705 for processing information. Computer system 1710 also includes a memory 1702 coupled to bus 1705 for storing information and instructions to be executed by processor 1701, including information and instructions for performing the techniques described above, for example. This memory may also be used for storing variables or other intermediate information during execution of instructions to be executed by processor 1701. Possible implementations of this memory may be, but are not limited to, random access memory (RAM), read only memory (ROM), or both. A storage device 1703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1703 may include source code, binary code, or software files for performing the techniques above, for example. Storage device and memory are both examples of computer readable mediums.

Computer system 1710 may be coupled via bus 1705 to a display 1712, such as a cathode ray tube (CRT) or liquid crystal display (LCD), for displaying information to a computer user. An input device 1711 such as a keyboard and/or mouse is coupled to bus 1705 for communicating information and command selections from the user to processor 1701. The combination of these components allows the user to communicate with the system. In some systems, bus 1705 may be divided into multiple specialized buses.

Computer system 1710 also includes a network interface 1704 coupled with bus 1705. Network interface 1704 may provide two-way data communication between computer system 1710 and the local network 1720. The network interface 1704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1704 sends and receives electrical, electromagnetic, or optical signals that carry digital data streams representing various types of information.

Computer system 1710 can send and receive information, including messages or other interface actions, through the network interface 1704 across a local network 1720, an Intranet, or the Internet 1730. For a local network, computer system 1710 may communicate with a plurality of other computer machines, such as server 1715. Accordingly, computer system 1710 and server computer systems represented by server 1715 may form a cloud computing network, which may be programmed with processes described herein. In the Internet example, software components or services may reside on multiple different computer systems 1710 or servers 1731-1735 across the network. The processes described above may be implemented on one or more servers, for example. A server 1731 may transmit actions or messages from one component, through Internet 1730, local network 1720, and network interface 1704 to a component on computer system 1710. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
   receiving from a first analysis tool, filter criteria including an attribute of a data corpus stored in a database according to a schema;
   receiving from the database, semantic information describing a hierarchy of the schema organized according to an attribute level and a parameter level;
   processing the filter criteria and the semantic information to construct a bootstrapped graph structure comprising entities and relationships;
   receiving from a second analysis tool, an input comprising a payload including a parameter;
   referencing the bootstrapped graph structure and the input to calculate paths between entities and relationships and generate a SQL query including the parameter and an alias;
   resolving the SQL query against the database;
   receiving from the database, a corresponding query result including the parameter; and
   displaying the corresponding query result to a screen of an interface, wherein,
   the database comprises an in-memory database, and
   the bootstrapped graph structure is constructed by an in-memory database engine of the in-memory database.

2. A method as in claim 1 wherein the semantic information comprises Primary Key and Foreign Keys of tables of the schema.

3. A method as in claim 1 wherein the semantic information comprises metadata of tables of the schema.

4. A method as in claim 1 wherein:
   the bootstrapped graph structure is constructed by dynamically changing an earlier bootstrapped graph structure based upon the semantic information; and
   the earlier bootstrapped graph structure has a size larger than the bootstrapped graph structure.

5. A method as in claim 4 wherein the earlier bootstrapped graph structure was constructed based upon additional semantic information from another database.

6. A method as in claim 1 wherein the filter criteria is created from a global filter context object broadcast to another analysis tool, the global filter context object including the attribute.

7. A method as in claim 6 wherein:
   the global filter context object is generated by an in-memory database engine of the in-memory database.

8. A method as in claim 1 wherein:
   the SQL query is generated by an in-memory database engine of the in-memory database.

9. A non-transitory computer readable storage medium embodying a computer program for performing a method, said method comprising:
   receiving from a first analysis tool, filter criteria including an attribute of a data corpus stored in a database according to a schema;
   receiving from the database, semantic information describing a hierarchy of the schema organized according to an attribute level and a parameter level, the semantic information comprising Primary Key and Foreign Keys of tables of the schema;
   processing the filter criteria and the semantic information to construct a bootstrapped graph structure comprising entities and relationships;
   receiving from a second analysis tool, an input comprising a payload including a parameter;
   referencing the bootstrapped graph structure and the input to calculate paths between entities and relationships and generate a SQL query including the parameter and an alias;
   resolving the SQL query against the database;
   receiving from the database, a corresponding query result including the parameter; and
   displaying the corresponding query result to a screen of an interface, wherein,
   the database comprises an in-memory database, and
   the bootstrapped graph structure is constructed by an in-memory database engine of the in-memory database.

10. A non-transitory computer readable storage medium as in claim 9 wherein the semantic information further comprises metadata of tables of the schema.

11. A non-transitory computer readable storage medium as in claim 9 wherein:
    the bootstrapped graph structure is constructed by dynamically changing an earlier bootstrapped graph structure based upon the semantic information; and
    the earlier bootstrapped graph structure has a size larger than the bootstrapped graph structure.

12. A non-transitory computer readable storage medium as in claim 9 wherein the filter criteria is created from a global filter context object broadcast to another analysis tool, the global filter context object including the attribute.

13. A computer system comprising:
    one or more processors;
    a software program, executable on said computer system, the software program configured to cause an in-memory database engine of an in-memory database to:
    receive from a first analysis tool, filter criteria including an attribute of a data corpus stored in the in-memory database according to a schema;
    receive from the in-memory database, semantic information describing a hierarchy of the schema organized according to an attribute level and a parameter level;
    process the filter criteria and the semantic information to construct a bootstrapped graph structure comprising entities and relationships;
    receive from a second analysis tool, an input comprising a payload including a parameter;
    reference the bootstrapped graph structure and the input to calculate paths between entities and relationships and generate a SQL query including the parameter and an alias;
    resolve the SQL query against the in-memory database;

receive from the in-memory database, a corresponding query result including the parameter; and display the corresponding query result to a screen of an interface, wherein, the filter criteria is created from a global filter context object broadcast to another analysis tool, the global filter context object including the attribute, and the global filter context object is created and broadcast by the in-memory database engine of the in-memory database.

14. A computer system as in claim 13 wherein the semantic information comprises:

Primary Key and Foreign Keys of tables of the schema; and metadata of tables of the schema.

15. A computer system as in claim 13 wherein:

the bootstrapped graph structure is constructed by dynamically changing an earlier bootstrapped graph structure based upon the semantic information; and the earlier bootstrapped graph structure has a size larger than the bootstrapped graph structure.

16. A computer system as in claim 13 wherein the earlier bootstrapped graph structure was constructed based upon additional semantic information from another database.

* * * * *